United States Patent
Sato et al.

(10) Patent No.: US 10,525,931 B2
(45) Date of Patent: Jan. 7, 2020

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Shinji Sato, Aichi-ken (JP); Kenji Fukuta, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 160 days.

(21) Appl. No.: 15/834,613

(22) Filed: Dec. 7, 2017

(65) Prior Publication Data

US 2018/0170305 A1     Jun. 21, 2018

(30) Foreign Application Priority Data

Dec. 20, 2016   (JP) ................................. 2016-247016

(51) Int. Cl.
*B60R 22/36*     (2006.01)
*B60R 22/34*     (2006.01)
*B60R 22/405*    (2006.01)

(52) U.S. Cl.
CPC ............ *B60R 22/36* (2013.01); *B60R 22/341* (2013.01); *B60R 22/3413* (2013.01); *B60R 22/405* (2013.01)

(58) Field of Classification Search
CPC ..... B60R 22/36; B60R 22/341; B60R 22/405; B60R 22/3413
See application file for complete search history.

(56) References Cited

U.S. PATENT DOCUMENTS

| 5,480,105 A | * | 1/1996 | Fujimura | ............... B60R 22/405 242/383.2 |
| 5,482,224 A | * | 1/1996 | Fujimura | ................ B60R 22/36 242/376 |

(Continued)

FOREIGN PATENT DOCUMENTS

| JP | H10-119719 A | 5/1998 |
| JP | 2000-71935 A | 3/2000 |

(Continued)

OTHER PUBLICATIONS

Office Action issued in the corresponding Japanese Application No. 2016-247016 dated Feb. 13, 2018.

(Continued)

*Primary Examiner* — Sang K Kim
(74) *Attorney, Agent, or Firm* — Roberts Mlotkowski Safran Cole & Calderon P.C.

(57) ABSTRACT

A serrated portion is formed on an outer peripheral portion of a lock base body of a lock base of a webbing take-up device. Furthermore, a flange portion is formed on the outer peripheral portion of the lock base body. The flange portion is disposed on a vehicle front side with respect to the serrated portion. Triangular grooves of the serrated portion are closed by the flange portion. When the lock base becomes displaced in a vehicle rearward direction and the flange portion comes into abutting contact with a leg plate of a frame, further displacement of the lock base in the vehicle rearward direction is blocked. Due to this, engagement between the serrated portion and ratchet teeth of a ratchet hole in the leg plate can be maintained.

9 Claims, 5 Drawing Sheets

(56) References Cited

U.S. PATENT DOCUMENTS

| | | | |
|---|---|---|---|
| 2013/0154337 A1* | 6/2013 | Yoshioka | B60R 22/405 |
| | | | 297/476 |
| 2013/0264408 A1 | 10/2013 | Maekubo et al. | |
| 2014/0197262 A1 | 7/2014 | Yamada et al. | |
| 2014/0203132 A1* | 7/2014 | Yamada | B60R 22/3416 |
| | | | 242/382.1 |
| 2014/0239110 A1* | 8/2014 | Yamada | B60R 22/405 |
| | | | 242/384.2 |
| 2016/0236647 A1* | 8/2016 | Sato | B60R 22/405 |
| 2016/0347274 A1* | 12/2016 | Fukuta | B60R 22/34 |

FOREIGN PATENT DOCUMENTS

| | | |
|---|---|---|
| JP | 2000071935 A | 3/2000 |
| JP | 2015-137074 A | 7/2015 |

OTHER PUBLICATIONS

Extended European Search Report issued in the corresponding EP Application No. 17207259.7 dated Apr. 11, 2018.

\* cited by examiner

WEBBING TAKE-UP DEVICE

CROSS-REFERENCE TO RELATED APPLICATION

This application claims priority under 35 USC 119 from Japanese Patent Application No. 2016-247016 filed on Dec. 20, 2016, the disclosure of which is incorporated by reference herein.

BACKGROUND

Field of the Invention

The present disclosure relates to a webbing take-up device that can suppress rotation of a spool as a result of an engaging portion of a rotating portion becoming engaged with an suppressing portion.

Related Art

There is a webbing take-up device where a side wall portion is provided on an axial direction side of a spindle (spool) and engaging teeth (engaging portion) are formed on an outer peripheral portion of the side wall portion (as an example, see Japanese Patent Application Laid-open No. 2015-137074). In this type of webbing take-up device, when the engaging teeth become engaged with ratchet teeth or the like formed on a frame as a result of the side wall portion being moved in a radial direction, rotation of the side wall portion is suppressed and rotation of the spindle is suppressed. In this configuration, when the rotating portion is moved in the axial direction, the engaging teeth are moved in the axial direction with respect to the ratchet teeth or the like formed on the frame.

SUMMARY

In consideration of the circumstances described above, a webbing take-up device that can limit movement of the engaging portion in the axial direction with respect to the suppressing portion is obtained.

A webbing take-up device pertaining to a first aspect includes a spool on which a webbing of a seat belt device is taken up, and to which rotational force in a pull-out direction is applied due to the webbing being pulled; a rotating portion that is rotated by rotation of the spool; an engaging portion that is formed on an outer peripheral portion of the rotating portion; a suppressing portion that opposes the engaging portion in a radial direction of the rotating portion, rotation of the rotating portion being suppressed by the engaging portion being engaged with the suppressing portion as a result of the rotating portion being moved closer to the suppressing portion in the radial direction; and an abutting portion that is provided at the rotating portion, and that opposes the suppressing portion on one side along an axial direction of the rotating portion, movement of the rotating portion toward another side along the axial direction of the rotating portion being blocked by the abutting portion being abutted with the suppressing portion.

According to the webbing take-up device of the first aspect, movement of the rotating portion toward the another side along the axial direction of the rotating portion is blocked by the abutting portion provided on the rotating portion coming into abutting contact with the suppressing portion. Due to this, in a state in which the engaging portion of the rotating portion and the suppressing portion are engaged with each other, the engaging portion can be limited from moving away toward the another side along the axial direction of the rotating portion relative to the suppressing portion.

A webbing take-up device pertaining to a second aspect is the webbing take-up device of the first aspect, wherein: the rotating portion is configured separately from the spool, and the webbing take-up device further comprises an energy absorbing member that couples the rotating portion and the spool to each other, that limits relative rotation of the spool with respect to the rotating portion, and that becomes deformed in a case in which a rotational load of relative rotation of the spool with respect to the rotating portion has exceeded a predetermined magnitude, to thereby allow relative rotation of the spool with respect to the rotating portion.

According to the webbing take-up device of the second aspect, even if the energy absorbing member tries to displace toward the another side along the axial direction of the rotating portion together with the rotating portion due to deformation of the energy absorbing member, movement toward the another side in the axial direction of the rotating portion can be blocked by the abutting portion coming into abutting contact with the suppressing portion.

A webbing take-up device pertaining to a third aspect is the webbing take-up device of the first aspect or the second aspect, further including: a lock member that is provided at the rotating portion and that limits rotation of the rotating portion in the pull-out direction by the lock member being engaged with the suppressing portion as a result of the lock member being moved toward a radial direction side of the rotating portion relative to the rotating portion at a time of a vehicle emergency, and an opposing portion that is provided at the lock member, that opposes the suppressing portion on the another side along the axial direction of the rotating portion, movement of the lock member toward the one side along the axial direction of the rotating portion being blocked by the opposing portion being abutted with the suppressing portion.

According to the webbing take-up device of the third aspect, movement of the lock member toward the one side along the axial direction of the rotating portion can be blocked by the opposing portion provided at the lock member coming into abutting contact with the suppressing portion. Due to this, in a state in which the lock member and the suppressing portion are engaged with each other, the lock member can be limited from moving away toward the one side along the axial direction of the rotating portion relative to the suppressing portion.

A webbing take-up device pertaining to a fourth aspect is the webbing take-up device of the third aspect, wherein movement of the lock member toward the another side along the axial direction of the rotating portion with respect to the rotating portion is limited.

According to the webbing take-up device of the fourth aspect, movement of the lock member toward the another side along the axial direction of the rotating portion with respect to the rotating portion is limited. For this reason, the movement toward the another side in the axial direction of the rotating portion can be blocked by the opposing portion of the lock member coming into abutting contact with the suppressing portion and movement of the lock member toward the another side along the axial direction of the rotating portion being blocked.

As described above, the webbing take-up device of the aspects can limit movement of the engaging portion in the axial direction with respect to the suppressing portion.

BRIEF DESCRIPTION OF THE DRAWINGS

An exemplary embodiment will be described in detail with reference to the following figures, wherein.

DETAILED DESCRIPTION

Figure 1:
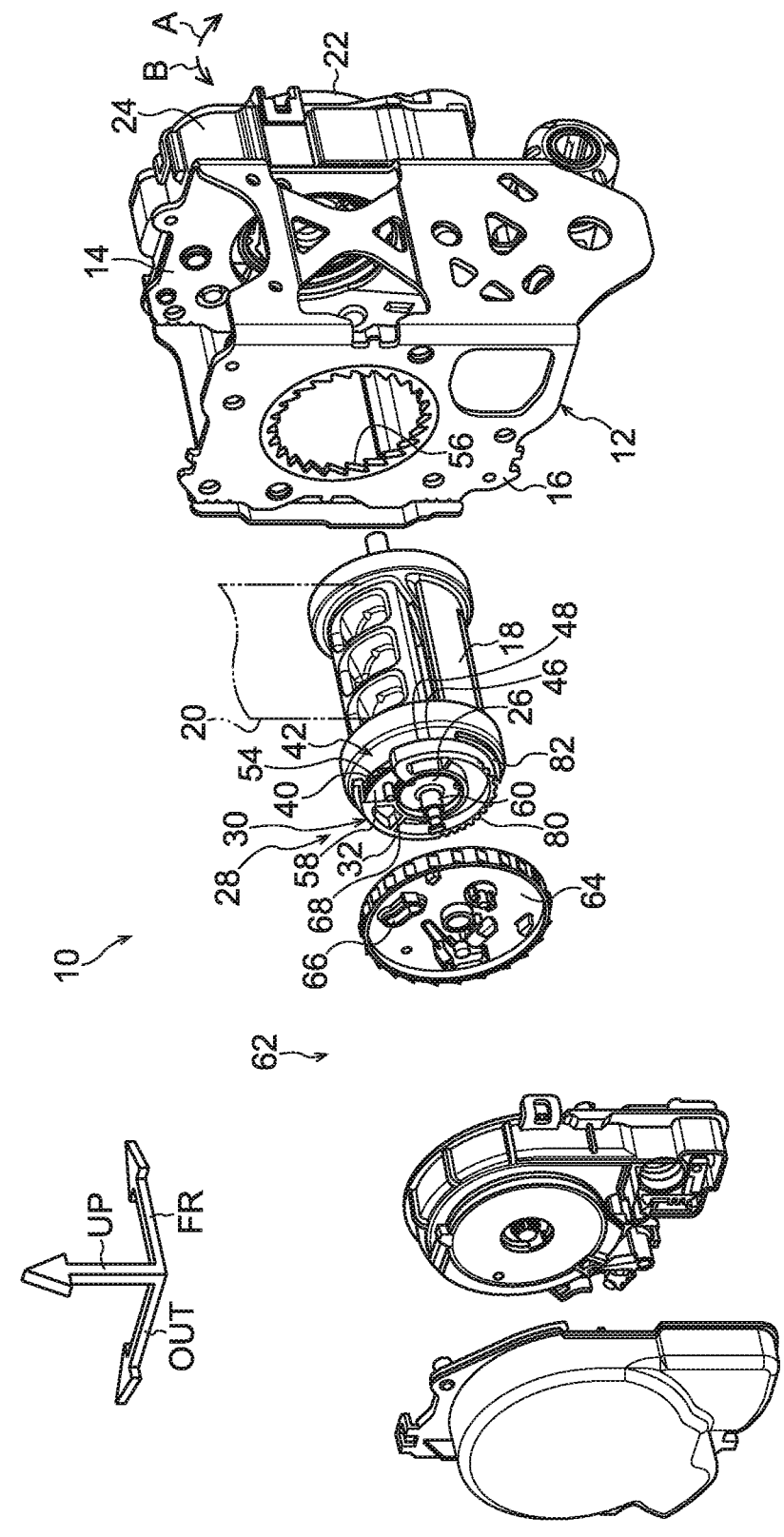
FIG. 1 is an exploded perspective view of a webbing take-up device pertaining to the exemplary embodiment.

Next, an exemplary embodiment will be described based on FIG. 1 to FIG. 5. It will be noted that in the drawings arrow FR indicates a forward direction of a vehicle to which a webbing take-up device 10 pertaining to the exemplary embodiment has been applied, arrow OUT indicates an outward direction in the vehicle width direction, and arrow UP indicates the vehicle upward direction. Furthermore, in the drawings arrow A indicates a take-up direction, which is one side in a rotational direction of a spool 18, etc., and arrow B indicates a pull-out direction, which is the opposite direction of the take-up direction. Moreover, in the drawings arrow C indicates a lock direction, which is a swinging direction of a lock plate 42.

Configuration of Exemplary Embodiment

As shown in FIG. 1, the webbing take-up device 10 pertaining to the present exemplary embodiment is equipped with a frame 12 serving as a suppressing portion. The frame 12 is fixed to the vehicle lower side section of a center pillar (not shown in the drawings) serving as a vehicle body of the vehicle. Furthermore, the frame 12 is equipped with leg plates 14 and 16, and the leg plate 14 and the leg plate 16 oppose (face) each other in the substantially vehicle front and rear direction.

Furthermore, a spool 18 is provided in the frame 12. The spool 18 is formed substantially in the shape of a tube cylinder. The direction of the central axis of the spool 18 lies along the direction in which the leg plate 14 and the leg plate 16 oppose each other (that is, the substantially vehicle front and rear direction), and the spool 18 is rotatable about its central axis. A longitudinal direction base end portion of long band-like webbing 20 is anchored to the spool 18, and when the spool 18 is rotated in the take-up direction (the direction of arrow A in FIG. 1, etc.), the webbing 20 is taken up on the spool 18 from the longitudinal direction base end side. Furthermore, the webbing 20 extends in the vehicle upward direction from the spool 18, and a longitudinal direction distal end side of the webbing 20 passes through a slit hole formed in a through anchor (not shown in the drawings) supported on the center pillar on the vehicle upper side of the frame 12 and is returned back in the vehicle downward direction.

Moreover, the longitudinal direction distal end portion of the webbing 20 is anchored to an anchor plate (not shown in the drawings). The anchor plate is made of a metal plate material such as iron and is fixed, for example, to a floor (not shown in the drawings) of the vehicle or a frame member of a seat (not shown in the drawings) of the vehicle to which the webbing take-up device 10 has been applied.

Furthermore, a seat belt device for the vehicle to which the webbing take-up device 10 has been applied is equipped with a buckle device (not shown in the drawings). The buckle device is provided on the vehicle width direction inner side of the seat to which the webbing take-up device 10 is applied. An occupant seated in the seat fastens the webbing 20 across his/her body by pulling the webbing 20 across his/her body and causing a tongue (not shown in the drawings) provided on the webbing 20 to engage with the buckle device.

As shown in FIG. 1, a spring housing 22 is provided on the vehicle front side of the leg plate 14 of the frame 12. A spool urging member (not shown in the drawings) such as a spiral spring is provided inside the spring housing 22, and the spool 18 is urged in the take-up direction (the direction of arrow A in FIG. 1, etc.) by the urging force of the spool urging member.

Furthermore, a pretensioner 24 is provided between the leg plate 14 of the frame 12 and the spring housing 22. The pretensioner 24 is activated at the time of a vehicle emergency such as at the time of a vehicle crash. When the pretensioner 24 is activated, the spool 18 is rotated in the take-up direction (the direction of arrow A in FIG. 1, etc.) and the webbing 20 is taken up on the spool 18. Due to this, the restraining force exerted by the webbing 20 on the occupant is increased.

Figure 3:
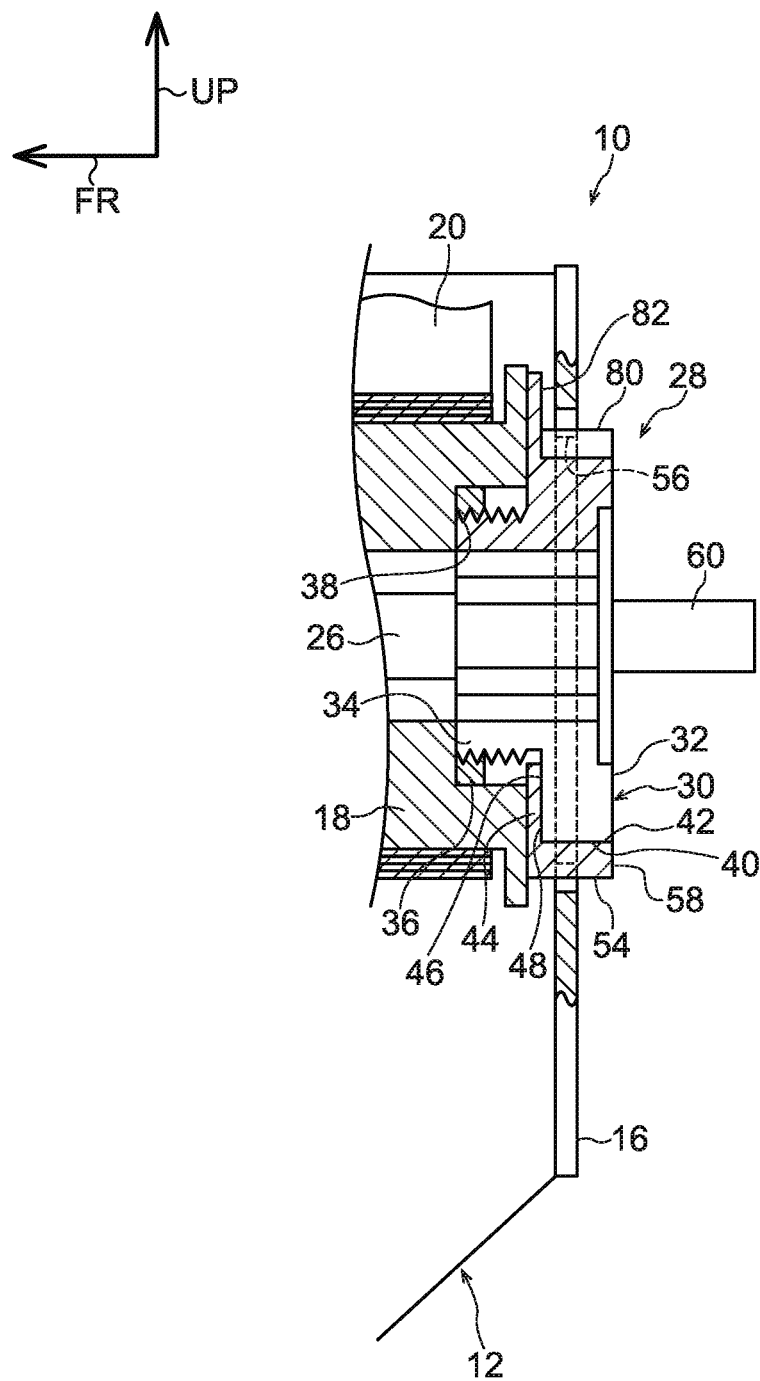
FIG. 3 is a front sectional view of a vehicle rear side section of the webbing take-up device pertaining to the exemplary embodiment.

Moreover, as shown in FIG. 1 and FIG. 3, the webbing take-up device 10 is equipped with a torsion bar 26 serving as an energy absorbing member that configures a force limiter mechanism. The torsion bar 26 is formed in the shape of a bar that is long in the substantially vehicle front and rear direction, and the vehicle front side section of the torsion bar 26 is disposed inside the spool 18 and is connected to the spool 18 in a state in which relative rotation with respect to the spool 18 is blocked.

Figure 2:
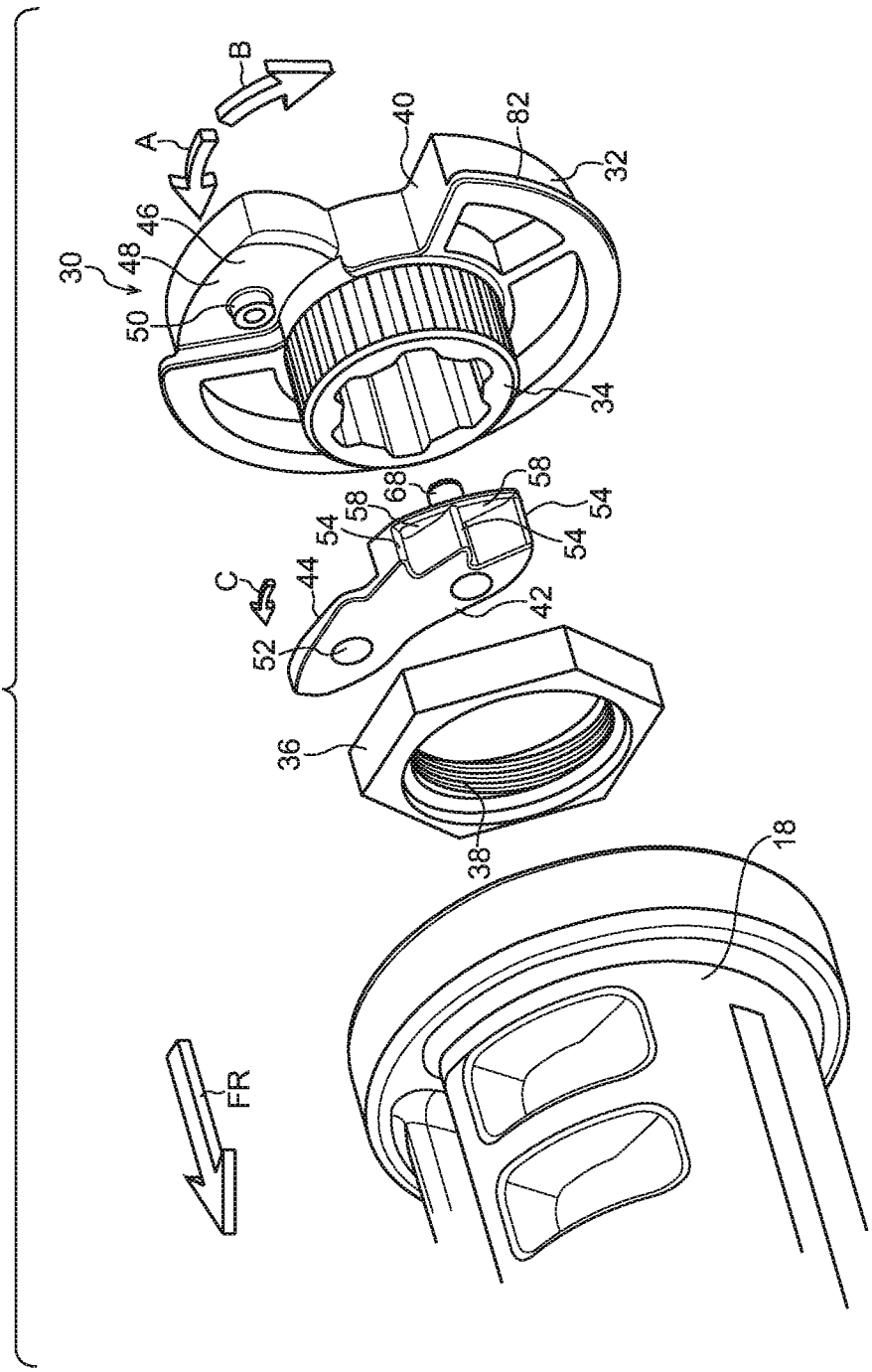
FIG. 2 is an exploded perspective view showing a spool, a lock base, and a lock plate as seen from a vehicle front side.

Furthermore, as shown in FIG. 1 to FIG. 4, the webbing take-up device 10 is equipped with a lock mechanism 28. The lock mechanism 28 is equipped with a lock base 30 serving as a rotating portion. The lock base 30 is equipped with a lock base body 32, the lock base body 32 is formed substantially in the shape of a disc, and part of the lock base body 32 is cut out in such a way as to be open at its outer peripheral side and its vehicle front and rear direction sides. As shown in FIG. 2 and FIG. 3, an insertion portion 34 is provided on the vehicle front side of the lock base body 32. The insertion portion 34 is formed in the shape of a tube cylinder and is disposed coaxially with respect to the lock base body 32. The insertion portion 34 is inserted inside the spool 18 from the vehicle rear side. At the vehicle rear side section of the spool 18, the inner peripheral shape of the spool 18 is larger than the insertion portion 34, and the inner peripheral shape of the vehicle rear side section of the spool 18 as seen from the vehicle rear side is noncircular (in the present exemplary embodiment, a substantially hexagonal shape).

Inside the vehicle rear side section of the spool 18 is provided a force limiter stopper 36 (hereinafter shortened to "FL stopper 36"). The FL stopper 36 is formed in a plate shape or a block shape, and the thickness direction of the FL stopper 36 coincides with the vehicle front and rear direction. The outer peripheral shape of the FL stopper 36 is the same shape as the inner peripheral shape of the vehicle rear side section of the spool 18. For this reason, relative rotation of the FL stopper 36 with respect to the spool 18 is blocked.

Furthermore, a female threaded hole 38 is formed in the FL stopper 36. The female threaded hole 38 penetrates the FL stopper 36 in the thickness direction of the FL stopper 36, and male threads formed on the outer peripheral portion of the insertion portion 34 of the lock base 30 are screwed into the female threaded hole 38. When the FL stopper 36 is relatively rotated in the pull-out direction (the direction of arrow B in FIG. 2, etc.) with respect to the lock base 30, the female threads of the female threaded hole 38 in the FL stopper 36 are guided by the male threads of the insertion portion 34, whereby the FL stopper 36 is slid in the vehicle rearward direction.

When the FL stopper 36 comes into abutting contact with the vehicle front side surface of the lock base body 32 of the lock base 30 due to the sliding of the FL stopper 36 in the vehicle rearward direction, the sliding of the FL stopper 36 in the vehicle rearward direction is blocked, whereby relative rotation of the FL stopper 36 in the pull-out direction (the direction of arrow B in FIG. 2, etc.) with respect to the lock base 30 is blocked. As mentioned above, relative rotation of the FL stopper 36 with respect to the spool 18 is blocked, so due to relative rotation of the FL stopper 36 in the pull-out direction with respect to the lock base 30 being blocked, relative rotation of the spool 18 in the pull-out direction with respect to the lock base 30 is blocked.

As shown in FIG. 3, the vehicle rear side section of the torsion bar 26 is inserted into the lock base 30, and relative rotation of the lock base 30 with respect to the torsion bar 26 is blocked. For this reason, the lock base 30 is linked via the torsion bar 26 to the spool 18, and relative rotation of the lock base 30 with respect to the spool 18 is indirectly blocked.

As shown in FIG. 2, the cutout section of the lock base 30 mentioned above is a lock plate disposing portion 40. The lock plate disposing portion 40 is open at part of the outer periphery of the lock base 30 and is open at both vehicle front and rear direction sides of the lock base 30. Inside the lock plate disposing portion 40 is disposed a body section of a lock plate 42 serving as a lock member. The body section of the lock plate 42 is formed in a plate shape or a block shape, and the thickness direction of the body section of the lock plate 42 coincides with the vehicle front and rear direction. A tail portion 44 extends from the end portion on the take-up direction side (the side in the direction of arrow A in FIG. 2, etc.) of the body section of the lock plate 42. The tail portion 44 is formed in a plate shape. The thickness direction of the tail portion 44 coincides with the vehicle front and rear direction, the thickness dimension of the tail portion 44 is smaller than the thickness dimension of the body section of the lock plate 42, and the tail portion 44 is formed at a location further toward the spool 18 side (the vehicle front side) than the thickness direction middle portion of the body section of the lock plate 42.

A tail portion disposing portion 46 is formed in the lock base 30 in correspondence to the tail portion 44 of the lock plate 42. The tail portion disposing portion 46 is a recess portion that is open at the vehicle front side of the lock base 30. Furthermore, the tail portion disposing portion 46 is open at the outer peripheral portion of the lock base 30 and is communicated to the lock plate disposing portion 40 on its pull-out direction side (the side in the direction of arrow B in FIG. 2, etc.). Furthermore, the vehicle rear side surface of the tail portion disposing portion 46 is a limiting portion 48, and the limiting portion 48 opposes the vehicle rear side surface of the spool 18 in the direction of the central axis of the spool 18.

Moreover, the vehicle front and rear direction dimension of the tail portion disposing portion 46 is set the same as, or slightly larger than, the thickness dimension of the tail portion 44 of the lock plate 42, and a gap equal to or greater than the thickness dimension of the tail portion 44 is formed between the limiting portion 48 of the tail portion disposing portion 46 and the vehicle rear side surface of the spool 18 in a state in which the vehicle front side surface of the lock base body 32 of the lock base 30 is in abutting contact with the vehicle rear side surface of the spool 18. In a state in which the body section of the lock plate 42 is disposed in the lock plate disposing portion 40 of the lock base 30, the tail portion 44 of the lock plate 42 is disposed in the tail portion disposing portion 46 of the lock base 30 (the gap between the limiting portion 48 and the vehicle rear side surface of the spool 18).

Furthermore, a support pin 50 is provided on the tail portion disposing portion 46. The support pin 50 projects in the vehicle forward direction from the limiting portion 48 of the tail portion disposing portion 46. A support hole 52 is formed in the tail portion 44 of the lock plate 42 in correspondence to the support pin 50. The support hole 52 penetrates the tail portion 44 in the thickness direction of the lock plate 42 (the vehicle front and rear direction). The support pin 50 is inserted into the support hole 52, whereby the lock plate 42 is supported by the support pin 50 and is swingable (rotatable) in the lock direction (the direction of arrow C in FIG. 2, etc.), which is one side about the support pin 50, and the opposite direction.

Figure 4:
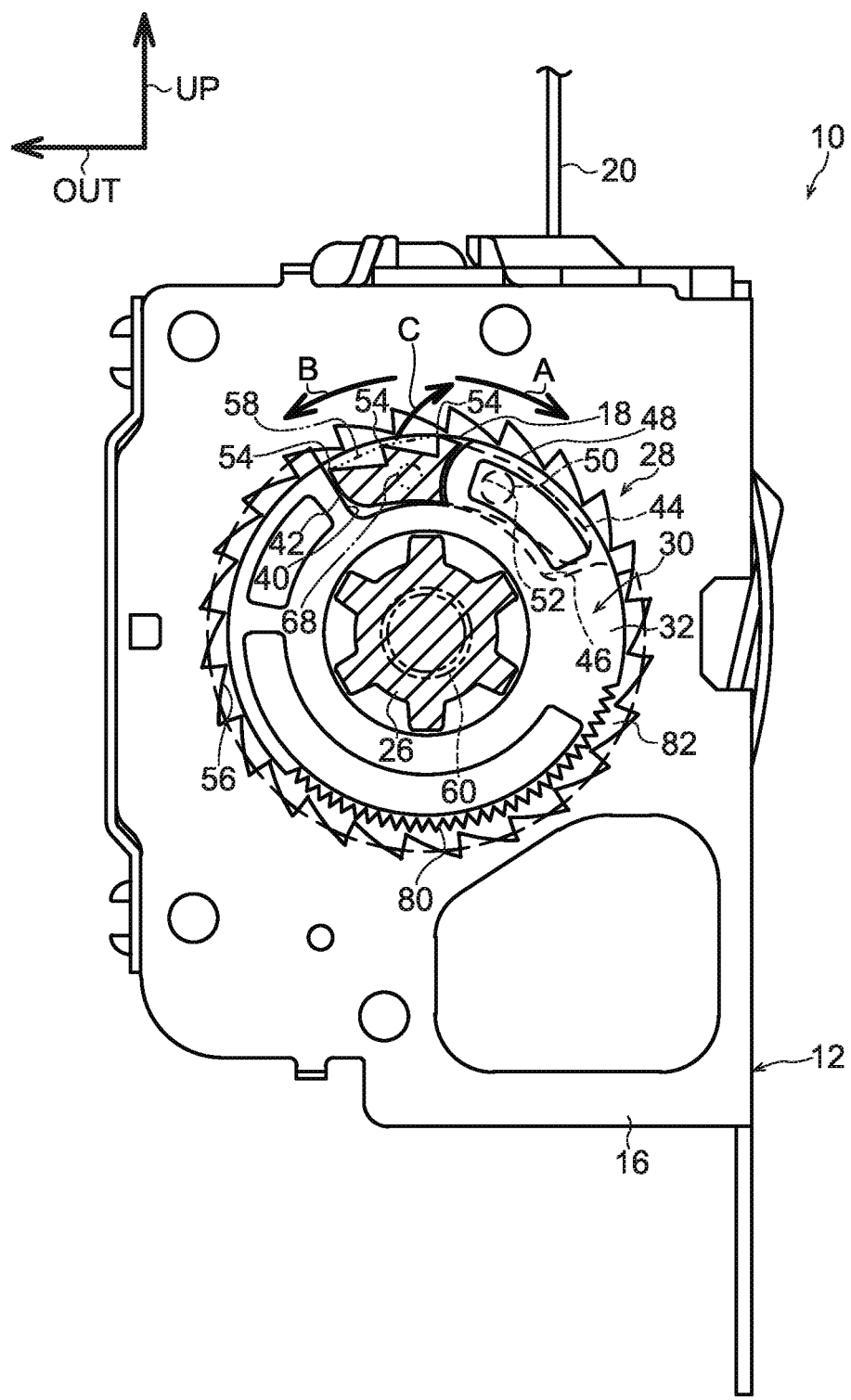
FIG. 4 is a side view showing the lock base, etc., of the webbing take-up device pertaining to the exemplary embodiment as seen from a vehicle rear side.

Furthermore, plural lock teeth 54 are formed on the lock plate 42. The lock teeth 54 are formed on an end portion of the body section of the lock plate 42, positioned on the opposite side of the tail portion 44 side. As shown in FIG. 1, FIG. 3, and FIG. 4, a ratchet hole 56 is formed in the leg plate 16 of the frame 12 in correspondence to the lock teeth 54 of the lock plate 42. The ratchet hole 56 is formed coaxially with respect to the spool 18 and is equipped with inner ratchet teeth serving as engaging teeth.

When the lock plate 42 is swung in the lock direction (the direction of arrow C in FIG. 1, etc.) about the support pin 50, a portion at side of the body section of the lock plate 42 opposite the tail portion 44 side is moved outward in the radial direction of the lock base 30. When, due to this, the lock teeth 54 of the lock plate 42 mesh with the ratchet teeth of the ratchet hole 56 in the leg plate 16 of the frame 12, rotation of the lock base 30 in the pull-out direction (the direction of arrow B in FIG. 1, etc.) is limited.

Moreover, as shown in FIG. 2 and FIG. 3, the lock plate 42 is equipped with fins 58 serving as an opposing portion. The fins 58 are disposed between mutually adjacent lock teeth 54 in the lock plate 42 and connect the vehicle rear side ends of the mutually adjacent lock teeth 54. In a state in which the lock teeth 54 of the lock plate 42 are meshed with the ratchet teeth of the ratchet hole 56, the fins 58 oppose the ratchet teeth of the ratchet hole 56 on the vehicle rear side (on another side along the axial direction of the rotating portion) of the ratchet teeth.

As shown in FIG. 1 and FIG. 3, the torsion bar 26 penetrates the lock base 30, and the section of the torsion bar 26 further toward the vehicle rear side than the lock base 30 is a support shaft 60. The support shaft 60 is disposed coaxially with respect to the spool 18.

A V-gear 64 that configures a sensor mechanism 62 is supported on the support shaft 60 in such a way that the V-gear 64 freely rotates. A guide hole 66 is formed in the V-gear 64. The guide hole 66 penetrates the V-gear 64 in the vehicle front and rear direction, and a guide pin 68 is inserted into the guide hole 66 from the vehicle front side. The guide pin 68 projects from the vehicle rear side surface of the lock plate 42, and when the lock base 30 is relatively rotated in the pull-out direction (the direction of arrow B in FIG. 1, etc.) with respect to the V-gear 64, the guide pin 68 is guided by and moved in the guide hole 66, whereby the lock plate 42 is swung in the lock direction (the direction of arrow C in FIG. 1, etc.) about the support pin 50.

Furthermore, a following spring (not shown in the drawings) is provided between the V-gear 64 and the lock base 30. The V-gear 64 can rotate following the rotation of the lock base 30 due to the urging force of the following spring. Furthermore, in a state in which rotation of the V-gear 64 in the pull-out direction (the direction of arrow B in FIG. 1, etc.) is blocked, the lock base 30 can relatively rotate in the pull-out direction with respect to the V-gear 64 counter to the urging force of the following spring.

Furthermore, the sensor mechanism 62 is equipped with a VSIR mechanism (not shown in the drawings) that is activated in a sudden deceleration state of the vehicle at the time of a vehicle emergency such as at the time of a vehicle crash, and rotation of the V-gear 64 in the pull-out direction is blocked as a result of the VSIR mechanism being activated. Moreover, the sensor mechanism 62 is equipped with a WSIR mechanism (not shown in the drawings) that is activated as a result of the rotational acceleration of the spool 18 in the pull-out direction exceeding a predetermined magnitude at the time of a vehicle emergency, and rotation of the V-gear 64 in the pull-out direction is blocked as a result of the WSIR mechanism being activated.

As shown in FIG. 1 to FIG. 4, a serrated portion 80 serving as an engaging portion is formed on the outer peripheral portion of the lock base body 32 of the lock base 30. The serrated portion 80 is provided in at least a section of the lock base body 32. This section excludes a location where the lock plate disposing portion 40 and the tail portion disposing portion 46 are formed, and this section is on the opposite side of the lock plate disposing portion 40 side or tail portion disposing portion 46 side across the center of the lock base 30. The serrated portion 80 is equipped with plural triangular grooves, and the triangular grooves are adjacent to each other in the circumferential direction of the lock base 30. Furthermore, each of the plural triangular grooves of the serrated portion 80 has a substantially triangular shape whose width dimension becomes smaller inward in the radial direction of the lock base 30, and the vehicle rear side ends of the triangular grooves are open.

Furthermore, the lock base 30 is equipped with a flange portion 82 serving as an abutting portion. The flange portion 82 is provided on a section of the lock base body 32 excluding the lock plate disposing portion 40 and the tail portion disposing portion 46, and extends outward in the radial direction of the lock base 30 from the vehicle front side end of the lock base body 32. The flange portion 82 opposes, on the vehicle front side (on one side along the axial direction of the rotating portion), the section of the leg plate 16 of the frame 12 on the outer side of the ratchet hole 56. Moreover, the flange portion 82 is disposed on the vehicle front side with respect to the serrated portion 80, and the vehicle front side ends of the triangular grooves of the serrated portion 80 are closed by the flange portion 82.

Operation and Effects of Exemplary Embodiment

Next, the action and effects of the present exemplary embodiment will be described.

In the webbing take-up device 10, the sensor mechanism 62 is activated at the time of a vehicle emergency such as at the time of a vehicle crash. For example, when the VSIR mechanism of the sensor mechanism 62 is activated due to a sudden deceleration of the vehicle at the time of a vehicle emergency, rotation of the V-gear 64 in the pull-out direction (the direction of arrow B in FIG. 1, etc.) is blocked. Furthermore, for example, when the body of the occupant is inertially moved in the vehicle forward direction at the time of a vehicle emergency, the webbing 20 fastened around the body of the occupant is pulled. Due to this, the lock base 30 is rotated in the pull-out direction together with the spool 18, and the V-gear 64 is rotated in the pull-out direction so as to follow the lock base 30. When the rotational acceleration of the V-gear 64 in the pull-out direction exceeds a predetermined magnitude, the WSIR mechanism of the sensor mechanism 62 is activated, whereby the rotation of the V-gear 64 in the pull-out direction is blocked.

When the webbing 20 is further pulled out and the lock base 30 is rotated in the pull-out direction together with the spool 18 in a state in which rotation of the V-gear 64 in the pull-out direction (the direction of arrow B in FIG. 1, etc.) is blocked in this way, the lock base 30 is relatively rotated in the pull-out direction with respect to the V-gear 64. When the lock base 30 is relatively rotated in the pull-out direction with respect to the V-gear 64 in this way, the guide pin 68 of the lock plate 42 is guided in the guide hole 66 in the V-gear 64 and the lock plate 42 is swung in the lock direction.

Due to this, the lock teeth 54 of the lock plate 42 are moved closer to the ratchet teeth of the ratchet hole 56 in the leg plate 16 of the frame 12, and the lock teeth 54 mesh with the ratchet teeth of the ratchet hole 56. Due to this, rotation of the lock base 30 in the pull-out direction (the direction of arrow B in FIG. 1, etc.) is limited and rotation of the spool 18 in the pull-out direction is limited. Due to rotation of the spool 18 in the pull-out direction is limited in this way, the pulling-out of the webbing 20 from the spool 18 is limited, so the body of the occupant can be effectively restrained by the webbing 20.

Figure 5:
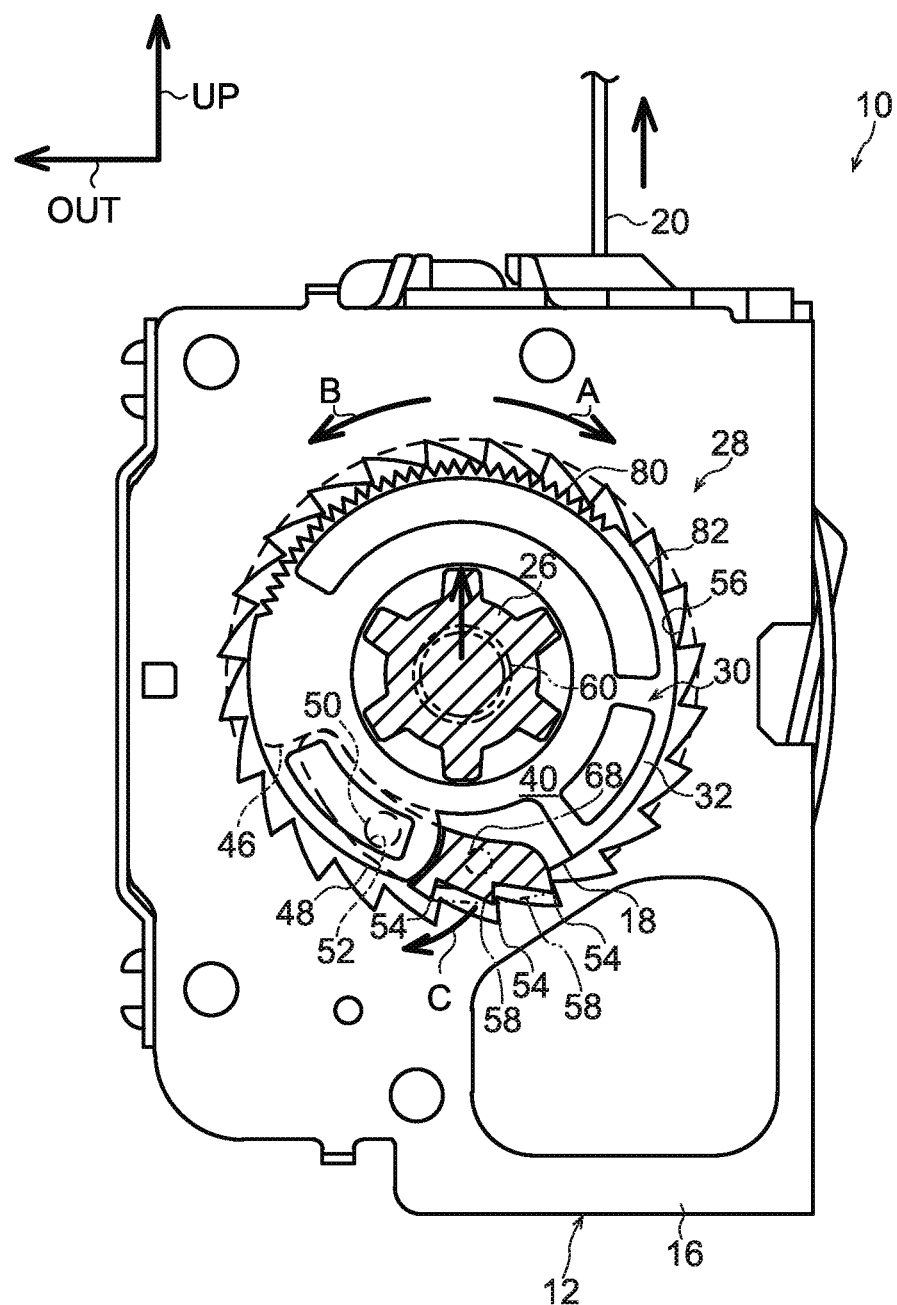
FIG. 5 is a side view, corresponding to FIG. 4, showing a state in which an engaging portion of the lock base is engaged with ratchet teeth of a leg plate of a frame.

Furthermore, when the webbing 20 is pulled by the body of the occupant at the time of a vehicle emergency, the spool 18 is rotated in the pull-out direction (the direction of arrow B in FIG. 1, etc.) and is pulled in the vehicle upward direction (i.e., the direction in which the webbing 20 extends out from the spool 18). Due to this, the spool 18 becomes displaced in the vehicle upward direction while being rotated in the pull-out direction. As shown in FIG. 5, when, due to this, the tips of the ratchet teeth of the ratchet hole 56 enter the insides of the triangular grooves of the serrated portion 80 of the lock base 30, the wall surfaces on the take-up direction sides (the sides in the direction of arrow A in FIG. 5, etc.) of the triangular grooves come into abutting contact with the tips of the ratchet teeth of the ratchet hole 56, whereby rotation of the lock base 30 in the pull-out direction is limited. Also due to this, rotation of the spool 18 in the pull-out direction is limited, so the pulling-out of the webbing 20 from the spool 18 is limited and the body of the occupant can be effectively restrained by the webbing 20.

In a state in which the lock teeth 54 of the lock plate 42 are meshed with the ratchet teeth of the ratchet hole 56 and the wall surfaces on the take-up direction sides (the sides in the direction of arrow A in FIG. 5, etc.) of the triangular grooves of the serrated portion 80 are in abutting contact with the tips of the ratchet teeth of the ratchet hole 56 in this way, the load from the ratchet teeth of the ratchet hole 56 is dispersed and acts on the lock teeth 54 of the lock plate 42 and the wall surfaces on the take-up direction sides of the triangular grooves of the serrated portion 80. For this reason, the load from the ratchet teeth of the ratchet hole 56 can be kept from concentrating in the lock teeth 54 (concentrating of the load from the ratchet teeth of the ratchet hole 56 in the lock teeth 54 can be suppressed). Due to this, a reduction in the mechanical properties, such as mechanical strength and rigidity, of the lock teeth 54 becomes possible, so that the lock plate 42 can be kept from growing in size and increasing in weight (growing in size and increasing in weight of the lock plate 42 can be suppressed).

Furthermore, the serrated portion 80 is provided at least on the opposite side of the lock plate disposing portion 40 or tail portion disposing portion 46 side across the center of the lock base 30. Due to this, in a state in which the lock teeth 54 are meshed with the ratchet teeth of the ratchet hole 56 and the wall surfaces on the take-up direction sides (the sides in the direction of arrow A in FIG. 5, etc.) of the triangular grooves of the serrated portion 80 are in abutting contact with the tips of the ratchet teeth of the ratchet hole 56, the load from the ratchet teeth of the ratchet hole 56 can be kept from being disproportionate on the lock teeth 54 side (concentrating of the load from the ratchet teeth of the ratchet hole 56 on the lock teeth 54 side can be suppressed). For this reason, displacement of the lock base 30 caused by the load from the ratchet teeth of the ratchet hole 56 can be suppressed.

In this state in which rotation of the lock base 30 in the pull-out direction (the direction of arrow B in FIG. 1, etc.) is limited, when the rotational load in the pull-out direction applied to the spool 18 by the pulling of the webbing 20 by the body of the occupant exceeds the mechanical strength of the torsion bar 26 with respect to twisting thereof, the torsion bar 26 twists in such a way that the vehicle front side section of the torsion bar 26 (i.e., the section connected to the spool 18) rotates in the pull-out direction with respect to the vehicle rear side section of the torsion bar 26 (i.e., the section connected to the lock base 30). The spool 18 can rotate in the pull-out direction an amount corresponding to the twisting amount of the torsion bar 26, and the webbing 20 is pulled out from the spool 18 an amount corresponding to the rotational amount of the spool 18 in the pull-out direction. The body of the occupant can inertially move in the vehicle forward direction an amount corresponding to the length of the webbing 20 pulled out from the spool 18 in this way, and some of the tensile load applied to the webbing 20 from the body of the occupant is supplied to and absorbed by the twisting of the torsion bar 26.

When twisting occurs in the torsion bar 26 as described above, sometimes the torsion bar 26 becomes deformed in such a way as to stretch (extend) in its longitudinal direction (the vehicle front and rear direction). When the torsion bar 26 stretches in this way, there is the potential for the lock base 30 engaged with the vehicle rear side section of the torsion bar 26 to become displaced in the vehicle rearward direction together with the vehicle rear side section of the torsion bar 26. Here, when the lock base 30 becomes displaced in the vehicle rearward direction, the flange portion 82 of the lock base 30 is moved closer to the leg plate 16 of the frame 12. When the flange portion 82 comes into abutting contact with the leg plate 16 due to this, the displacement of the flange portion 82 in the vehicle rearward direction is blocked by the leg plate 16, whereby further displacement of the lock base 30 in the vehicle rearward direction is blocked.

The flange portion 82 is formed on the vehicle front side with respect to the serrated portion 80 of the lock base 30, so in a state in which the flange portion 82 is in abutting contact with the leg plate 16, the serrated portion 80 and the inner peripheral portion of the ratchet hole 56 oppose each other in the radial direction of the lock base 30 and the ratchet hole 56 of the leg plate 16. For this reason, due to the flange portion 82 being in abutting contact with the leg plate 16 and displacement of the lock base 30 in the vehicle rearward direction being blocked, the serrated portion 80 can be blocked from moving away in the vehicle rearward direction relative to the inner peripheral portion of the ratchet hole 56. Due to this, even when the torsion bar 26 stretches and the lock base 30 becomes displaced in the vehicle rearward direction as described above, a state can be maintained in which the wall surfaces on the take-up direction sides (the sides in the direction of arrow A in FIG. 5, etc.) of the triangular grooves of the serrated portion 80 are in abutting contact with the tips of the ratchet teeth of the ratchet hole 56.

On the other hand, when the lock base 30 is displaced in the vehicle forward direction, the tail portion 44 of the lock plate 42 is pushed in the vehicle forward direction by the limiting portion 48 of the tail portion disposing portion 46 of the lock base 30, and the lock plate 42 becomes displaced in the vehicle forward direction. Here, the fins 58 are provided between the mutually adjacent lock teeth 54 in the lock plate 42. In a state in which the lock teeth 54 are meshed with the ratchet teeth of the ratchet hole 56, the fins 58 oppose the ratchet teeth of the ratchet hole 56 on the vehicle rear side of the ratchet teeth of the ratchet hole 56.

For this reason, in a state in which the lock teeth 54 are meshed with the ratchet teeth of the ratchet hole 56, displacement of the lock plate 42 in the vehicle forward direction is blocked as a result of the fins 58 coming into abutting contact with the ratchet teeth of the ratchet hole 56. Due to this, the lock teeth 54 can be blocked from moving away in the vehicle forward direction relative to the ratchet teeth of the ratchet hole 56.

Furthermore, due to displacement of the lock plate 42 in the vehicle forward direction being blocked in this way, displacement of the lock base 30 in the vehicle forward direction is blocked. For this reason, in this state, as long as the wall surfaces on the take-up direction sides (the sides in the direction of arrow A in FIG. 5, etc.) of the triangular grooves of the serrated portion 80 of the lock base 30 are in abutting contact with the tips of the ratchet teeth of the ratchet hole 56, the abutting contact between the wall surfaces on the take-up direction sides of the triangular grooves of the serrated portion 80 and the tips of the ratchet teeth of the ratchet hole 56 can be maintained.

Moreover, in the present exemplary embodiment, when the lock teeth 54 of the lock plate 42 meshing with the ratchet teeth of the ratchet hole 56 in the leg plate 16 of the frame 12, the fins 58 oppose, from the vehicle rear side, the ratchet teeth of the ratchet hole 56 (i.e., the leg plate 16), and in a state in which the lock plate 42 has not swung in the lock direction (the direction of arrow C in FIG. 2, etc.), the fins 58 do not oppose, from the vehicle rear side, the ratchet teeth of the ratchet hole 56 (i.e., the leg plate 16). For this reason, the lock base body 32 of the lock base 30 can be disposed inside the ratchet hole 56 as a result of the lock base 30 being moved in the vehicle rearward direction in a state in which the lock base 30 is disposed between the leg plate 14 and the leg plate 16 of the frame 12. For this reason, a reduction in the robustness and a reduction in the attachability of the lock base 30, etc., caused by the flange portion 80 being formed on the lock base body 32 of the lock base 30 can be suppressed.

It will be noted that although in the present exemplary embodiment the lock base 30 is configured separately from the spool 18, the webbing take-up device 10 may also have a configuration where the lock base 30 is molded integrally with the spool 18 and where the serrated portion 80 and the flange portion 82 are formed on the radial direction outer side of the spool 18, so that movement of the spool 18 in the vehicle rearward direction is limited by the flange portion 82.

Furthermore, in the present exemplary embodiment, the webbing take-up device 10 has a configuration where the fins 58 are provided between the mutually adjacent lock teeth 54 in the lock plate 42, but the webbing take-up device 10 may also have a configuration where the fins 58 are not provided on the lock plate 42.

What is claimed is:

1. A webbing take-up device comprising:
    a frame that is provided with leg plates;
    a spool that is provided in the frame between the leg plates on which a webbing is taken up, and to which rotational force in a pull-out direction is applied due to the webbing being pulled;
    a rotating portion that is rotated by rotation of the spool;
    an engaging portion that is formed on an outer peripheral portion of the rotating portion; and
    a suppressing portion that is one of the leg plates of the frame, that opposes the engaging portion in a radial direction of the rotating portion, rotation of the rotating portion being suppressed by the engaging portion being engaged with the suppressing portion as a result of the rotating portion being moved closer to the suppressing portion in the radial direction;
    wherein an abutting portion is provided at the rotating portion, extends outward in the radial direction of the rotating portion, and opposes the suppressing portion on one side along an axial direction of the rotating portion, such that movement of the rotating portion toward another side along the axial direction of the rotating portion is blocked by the abutting portion being abutted with the suppressing portion in the axial direction.

2. The webbing take-up device of claim 1, wherein: the rotating portion is configured separately from the spool, and the webbing take-up device further comprises an energy absorbing member that couples the rotating portion and the spool to each other, that limits relative rotation of the spool with respect to the rotating portion, and that becomes deformed in a case in which a rotational load of relative rotation of the spool with respect to the rotating portion has exceeded a predetermined magnitude, to thereby allow relative rotation of the spool with respect to the rotating portion.

3. The webbing take-up device of claim 2, further comprising: a lock member that is provided at the rotating portion and that limits rotation of the rotating portion in the pull-out direction by the lock member being engaged with the suppressing portion as a result of the lock member being moved relative to the rotating portion at a time of a vehicle emergency, and an opposing portion that is provided at the lock member, that opposes the suppressing portion on the another side along the axial direction of the rotating portion, movement of the lock member toward the one side along the axial direction of the rotating portion being blocked by the opposing portion being abutted with the suppressing portion.

4. The webbing take-up device of claim 3, wherein movement of the lock member toward the another side along the axial direction of the rotating portion with respect to the rotating portion is limited.

5. The webbing take-up device of claim 1, further comprising: a lock member that is provided at the rotating portion and that limits rotation of the rotating portion in the pull-out direction by the lock member being engaged with the suppressing portion as a result of the lock member being moved relative to the rotating portion at a time of a vehicle emergency, and an opposing portion that is provided at the lock member, that opposes the suppressing portion on the another side along the axial direction of the rotating portion, movement of the lock member toward the one side along the axial direction of the rotating portion being blocked by the opposing portion being abutted with the suppressing portion.

6. The webbing take-up device of claim 5, wherein movement of the lock member toward the another side along the axial direction of the rotating portion with respect to the rotating portion is limited.

7. The webbing take-up device of claim 1, wherein the abutting portion extends outward in the radial direction of the rotating portion further than the engaging portion.

8. The webbing take-up device of claim 7, wherein
    a hole portion is formed at the suppressing portion, and an inner peripheral portion of the hole portion opposes the engaging portion in the radial direction of the rotating portion, rotation of the rotating portion being suppressed by the engaging portion being engaged with the inner peripheral portion of the hole portion of the suppressing portion,
    the abutting portion opposes a section of the suppressing portion, which section is at an outer side in the radial direction of the hole portion and in the vicinity of the inner peripheral portion, on the one side along the axial direction of the rotating portion, movement of the rotating portion toward the another side along the axial direction of the rotating portion is blocked by the abutting portion being abutted with said section of the suppressing portion in the axial direction.

9. The webbing take-up device of claim 8, wherein, at the rotating portion, the abutting portion is disposed further toward the one side in the axial direction than the engaging portion.

* * * * *